United States Patent
Cheng

(10) Patent No.: US 11,433,853 B2
(45) Date of Patent: Sep. 6, 2022

(54) VEHICLE UNLOCKING AUTHENTICATION METHOD AND APPARATUS BASED ON TERMINAL DEVICE

(71) Applicants: GUANGZHOU CHENGXING ZHIDONG MOTORS TECHNOLOGY CO., LTD., Guangzhou (CN); GUANGZHOU XIAOPENG MOTORS TECHNOLOGY CO., LTD., Guangzhou (CN)

(72) Inventor: Ziyao Cheng, Guangzhou (CN)

(73) Assignee: GUANGZHOU XIAOPENG MOTORS TECHNOLOGY CO., LTD., Guangzhou (CN)

(*) Notice: Subject to any disclaimer, the term of this patent is extended or adjusted under 35 U.S.C. 154(b) by 0 days.

(21) Appl. No.: 17/133,990

(22) Filed: Dec. 24, 2020

(65) Prior Publication Data
US 2021/0114558 A1  Apr. 22, 2021

Related U.S. Application Data

(63) Continuation of application No. PCT/CN2019/000934, filed on Jun. 28, 2019.

(30) Foreign Application Priority Data

Mar. 29, 2019  (CN) .......................... 201910256019.5

(51) Int. Cl.
| B60R 25/24 | (2013.01) |
| H04L 9/08  | (2006.01) |
| B60R 25/25 | (2013.01) |

(52) U.S. Cl.
CPC .......... B60R 25/241 (2013.01); B60R 25/257 (2013.01); H04L 9/0825 (2013.01);
(Continued)

(58) Field of Classification Search
CPC ................ B60R 25/241; B60R 25/257; B60R 2325/101; B60R 2325/108; B60R 25/246;
(Continued)

(56) References Cited

U.S. PATENT DOCUMENTS 6,496,107 B1 * 12/2002 Himmelstein ......... G07C 9/257
340/426.1
2001/0045890 A1 * 11/2001 Wu ..................... B60R 25/1004
340/426.18
(Continued)

FOREIGN PATENT DOCUMENTS

| CN | 101393658 A | 3/2009 |
| CN | 102251713 A | 11/2011 |

(Continued)

OTHER PUBLICATIONS

International Search Report of PCT/CN2019/093468, dated Dec. 27, 2019.
(Continued)

*Primary Examiner* — Edwin C Holloway, III
(74) *Attorney, Agent, or Firm* — J.C. Patents

(57) ABSTRACT

The present disclosure relates to the technical field of vehicles and discloses a vehicle unlocking authentication method and apparatus based on a terminal device, including: receiving an authentication request sent by a terminal device, to obtain a device fingerprint and a first authentication code; searching for a prestored service key corresponding to the device fingerprint, and calculating and obtaining a second authentication code according to the device fingerprint and the service key; determining a third authentication code and a fourth authentication code based on the first authentication code, the second authentication code, the device fingerprint, and the service key to complete the vehicle unlocking authentication by the terminal device. Implementing the embodiments of the present disclosure can
(Continued)

improve the safety for transmitting data during the process of authentication between the vehicle and the terminal device.

16 Claims, 8 Drawing Sheets

(52) U.S. Cl.
CPC ...... *H04L 9/0869* (2013.01); *B60R 2325/101* (2013.01); *B60R 2325/108* (2013.01)

(58) Field of Classification Search
CPC . B60R 25/34; B60R 2325/205; H04L 9/0825; H04L 9/0869; H04L 9/0894; H04L 9/3242; H04L 63/0876; H04L 2209/805; H04L 9/3231; H04L 2209/84; H04W 12/069; G07C 2009/00388; G07C 2009/00396; G07C 2009/00412; G07C 2009/0046; G07C 2009/005
USPC ....................................... 340/5.72
See application file for complete search history.

(56) References Cited

U.S. PATENT DOCUMENTS

| | | | | |
|---|---|---|---|---|
| 2004/0056776 | A1* | 3/2004 | Tsuji | B60R 25/24 340/12.22 |
| 2004/0220798 | A1* | 11/2004 | Chi | G10L 17/22 704/201 |
| 2006/0072755 | A1* | 4/2006 | Oskari | G07C 9/00309 380/270 |
| 2008/0048828 | A1* | 2/2008 | Buccinna | B60R 25/24 340/5.72 |
| 2014/0079217 | A1* | 3/2014 | Bai | H04W 12/50 380/270 |
| 2016/0057248 | A1* | 2/2016 | Tankha | H04W 12/08 726/6 |
| 2018/0034806 | A1 | 2/2018 | Winkelvos | |
| 2018/0234843 | A1* | 8/2018 | Smyth | H04W 12/02 |

FOREIGN PATENT DOCUMENTS

| | | |
|---|---|---|
| CN | 102752359 A | 10/2012 |
| CN | 103010158 A | 4/2013 |
| CN | 104952128 A | 9/2015 |
| CN | 105346502 A | 12/2016 |
| CN | 108068758 A | 5/2018 |
| CN | 108074299 A | 5/2018 |
| CN | 108377191 A | 8/2018 |
| CN | 108573552 A | 9/2018 |
| CN | 109067549 A | 12/2018 |
| JP | 2005175879 A | 6/2005 |
| JP | 2009275350 A | 11/2009 |

OTHER PUBLICATIONS

"A Protocol for a Secure Remote Keyless Entry System", Dec. 3, 2016.

"Composition and Maintenance of Faw Fengtian Ruizhi Anti Theft and Door Lock System (3)", Auto Maintenance Magazine, No. 4, 2006, 13-14, 2 pages in total.

* cited by examiner

VEHICLE UNLOCKING AUTHENTICATION METHOD AND APPARATUS BASED ON TERMINAL DEVICE

CROSS-REFERENCE TO RELATED APPLICATIONS

This disclosure is a continuation of International Application No. PCT/CN2019/093468, filed on Jun. 28, 2019, which claims priority to Chinese Patent Application No. 201910256019.5, filed on Mar. 29, 2019, both of which are hereby incorporated by reference in their entireties.

TECHNICAL FIELD

The present disclosure relates to the field of vehicle technology and, in particular, to a method and apparatus for vehicle unlocking authentication based on a terminal device.

BACKGROUND

With the development and popularization of the Internet of Things, some auto manufacturers choose to use card-type car keys to replace traditional physical keys. At present, the vehicle needs to authenticate the card-type car key before unlocking or locking and other operations are implemented. Generally, the normal authentication method of the card-type car key by the vehicle is: when the card-type car key approaches the vehicle, the card-type car key can sends key information and other data to the on-board electronic device of the vehicle by the Bluetooth protocol stack, so as to enable the on-board electronic device to realize matching authentication with the card-type car key according to the key information.

However, it has been found in practice that the current data transmission existed in the process of card-type car key authentication is completely dependent on the Bluetooth protocol stack, because different Bluetooth protocol stacks correspond to different safety levels, and Bluetooth protocols with lower safety levels may have problems such as channel hijacking or channel interference and so on in the usage process. Therefore, the above-mentioned authentication method for card-type car keys cannot guarantee the safety for transmitting data.

SUMMARY

Embodiments of the present disclosure disclose a method and apparatus for vehicle unlocking authentication based on a terminal device, which can improve the safety for transmitting data in the authentication process of car keys.

The first aspect of embodiments of the present disclosure discloses a vehicle unlocking authentication method based on a terminal device, and the method comprises:

receiving an authentication request sent by the terminal device, to obtain a device fingerprint and a first authentication code;

searching for a prestored service key corresponding to the device fingerprint, and calculating and obtaining a second authentication code according to the device fingerprint and the service key;

determining a third authentication code and a fourth authentication code based on the first authentication code, the second authentication code, the device fingerprint, and the service key, so as to complete a vehicle unlocking authentication by the terminal device.

As an optional implementation, in the first aspect of embodiments of the present disclosure, the determining a third authentication code and a fourth authentication code based on the first authentication code, the second authentication code, the device fingerprint, and the service key, so as to complete a vehicle unlocking authentication by the terminal device, comprises:

calculating a first random number generated randomly and the service key to obtain an exclusive OR value, when it is detected that the first authentication code is the same as the second authentication code;

sending a first response containing the exclusive OR value to the terminal device, so as to enable the terminal device to calculate and obtain a third authentication code according to the first response, and feed back a second response containing the third authentication code;

calculating and obtaining a fourth authentication code according to the device fingerprint, the service key, and the first random number, when the second response is received;

confirming the completion of the vehicle unlocking authentication by the terminal device, when it is detected that the third authentication code is the same as the fourth authentication code.

As an optional implementation, in the first aspect of embodiments of the present disclosure, after the confirming the completion of the vehicle unlocking authentication by the terminal device, the method further comprises:

performing authenticity verification of collected voice information of a vehicle user, when it is detected that the authentication request contains an unlocking instruction;

generating an authentication confirmation character, and generating a second random number randomly, when the authenticity verification of the voice information is passed;

calculating and obtaining a current authentication character based on the authentication confirmation character and the second random number;

performing an ignition operation when it is detected that the current authentication character is the same as the authentication confirmation character.

As an optional implementation, in the first aspect of embodiments of the present disclosure, the performing authenticity verification of collected voice information of a vehicle user, when it is detected that the authentication request contains an unlocking instruction, comprises:

collecting the voice information of the user of the vehicle when it is detected that the authentication request contains an unlocking instruction;

performing voiceprint identification on the voice information to obtain a target voiceprint;

comparing the target voiceprint with a prestored standard voiceprint;

determining that the authenticity verification of the voice information is passed when the target voiceprint is the same as the prestored standard voiceprint.

As an optional implementation, in the first aspect of embodiments of the present disclosure, the calculating and obtaining a current authentication character based on the authentication confirmation character and the second random number, comprises performing exclusive OR calculation on the authentication confirmation character and the second random number to calculate and obtain an authentication code;

performing exclusive OR calculation on the authentication code and the second random number to calculate and obtain the current authentication character.

As an optional implementation, in the first aspect of embodiments of the present disclosure, the performing an ignition operation when it is detected that the current authentication character is the same as the authentication confirmation character, comprises:

detecting whether Bluetooth connection state information is received, when it is detected that the current authentication character is the same as the authentication confirmation character;

detecting whether the ignition starting condition is satisfied, if the Bluetooth connection state information is received;

performing the ignition operation, if the ignition starting condition is satisfied.

As an optional implementation, in the first aspect of embodiments of the present disclosure, the detecting whether the ignition starting condition is satisfied, if the Bluetooth connection state information is received, comprises:

obtaining unlocking duration of the vehicle, if the Bluetooth connection state information is received;

judging whether the unlocking duration is greater than a preset unlocking duration;

confirming that the ignition starting condition is satisfied, if the unlocking duration is less than or equal to the preset unlocking duration;

judging whether a safety module of the vehicle receives the authentication confirmation character, if the unlocking duration is greater than the preset unlocking duration;

confirming that the ignition starting condition is satisfied, if the authentication confirmation character is received.

As an optional implementation, in the first aspect of embodiments of the present disclosure, the receiving an authentication request sent by the terminal device, and obtaining a device fingerprint and a first authentication code, comprises:

receiving the authentication request sent by the terminal device, to obtain the device fingerprint and the first authentication code from the authentication request, where the device fingerprint is obtained in the authentication request is generated by a number of feature values of the device fingerprint collected by the terminal device.

A second aspect of embodiments of the present disclosure discloses a vehicle unlocking authentication apparatus based on a terminal device, including:

a receiving unit, configured to receive an authentication request sent by the terminal device, and obtain a device fingerprint and a first authentication code;

a searching unit, configured to search a prestored service key corresponding to the device fingerprint, and calculate and obtain a second authentication code according to the device fingerprint and the service key;

a determining unit, configured to determine a third authentication code and a fourth authentication code based on the first authentication code, the second authentication code, the device fingerprint, and the service key, so as to complete a vehicle unlocking authentication by the terminal device.

A third aspect of embodiments of the present disclosure discloses a vehicle, including the vehicle unlocking authentication apparatus based on a terminal device disclosed in the second aspect.

A fourth aspect of embodiments of the present disclosure discloses a computer-readable storage medium which stores program code, where the program code includes instructions to execute part or all steps of any method of the first aspect.

A fifth aspect of embodiments of the present disclosure discloses a computer program product, which when the computer program product runs on a computer, causes the computer to execute part or all of the steps of any method in the first aspect.

A sixth aspect of embodiments of the present disclosure discloses an application publishing platform, which is used to publish a computer program product, wherein, when the computer program product runs on a computer, causing the computer to execute part or all of the steps of any method in the first aspect.

Compared with the prior art, the embodiments of the present disclosure have the following beneficial effects:

in embodiments of the present disclosure, receiving an authentication request sent by the terminal device, and obtaining a device fingerprint and a first authentication code; searching for a prestored service key corresponding to the device fingerprint, and calculating and obtaining a second authentication code according to the device fingerprint and the service key; determining a third authentication code and a fourth authentication code based on the first authentication code, the second authentication code, the device fingerprint, and the service key, so as to complete a vehicle unlocking authentication by the terminal device. It can be seen that implementing embodiments of the present disclosure can obtain the device fingerprint and the first authentication code from the authentication request sent by the terminal device, and calculate and obtain the second authentication code, the third authentication code and the fourth authentication code according to the device fingerprint, the first authentication code and the prestored service key, so as to realize the vehicle unlocking authentication by the terminal device, and so as to enable the vehicle and the terminal device to realize the unlocking authentication therebetween through the calculated data, which improves safety for transmitting data between the vehicle and the terminal device during the authentication process.

BRIEF DESCRIPTION OF DRAWINGS

To describe the technical solutions in embodiments of the present disclosure more clearly, the following briefly introduces the accompanying drawings needed for using in the embodiments. Apparently, the accompanying drawings in the following description are merely some embodiments of the present disclosure, and persons of ordinary skill in the art may still obtain other drawings according to these accompanying drawings without creative effort.

DESCRIPTION OF EMBODIMENTS

The technical solutions in the embodiments of the present disclosure will be described clearly and completely combined with the drawings in the embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

It should be noted that the terms "including" and "having" in the embodiments of the present disclosure and the accompanying drawings, and any variations thereof are intended to cover non-exclusive inclusions. For example, a process, a method, a system, a product, or a device that includes a series of steps or units is not limited to the listed steps or units, but optionally further includes unlisted steps or units, or optionally also includes other steps or units inherent in these processes, methods, products or device.

The embodiments of the present disclosure discloses a vehicle unlocking authentication method and apparatus based on a terminal device, which can improve the safety for transmitting data in the authentication process between the vehicle and the terminal device. Detailed descriptions are given below respectively.

Embodiment 1

Figure 1:
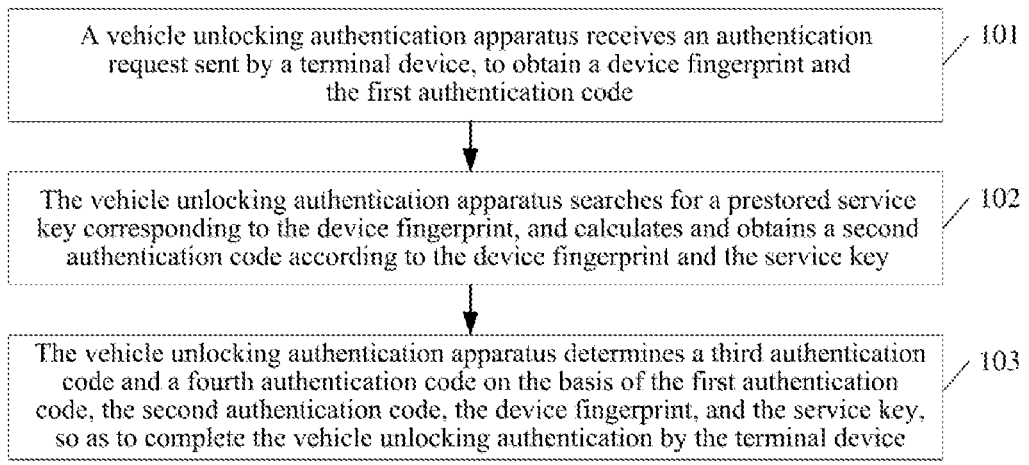
FIG. 1 is a schematic flowchart of a vehicle unlocking authentication method based on a terminal device disclosed by an embodiment of the present disclosure.

Please refer to FIG. 1. FIG. 1 is a schematic flowchart of a vehicle unlocking authentication method based on a terminal device disclosed by an embodiment of the present disclosure. As shown in FIG. 1, the method for vehicle unlocking authentication based on a terminal device may include the following steps:

101. A vehicle unlocking authentication apparatus receives an authentication request sent by a terminal device, to obtain a device fingerprint and a first authentication code.

In the embodiment of the present disclosure, the terminal device may be a smart phone, a smart bracelet, etc., which is not limited in the embodiments of the present disclosure. The software system such as an on-board system and so on can be set in the vehicle unlocking authentication apparatus, and the vehicle unlocking authentication apparatus can realize the control of any component of the vehicle, thereby facilitating the operation of the vehicle by the user of the vehicle. The vehicle unlocking authentication apparatus can include a vehicle external Bluetooth module, a vehicle body control module, a voice identification module, a safety module, and a complete vehicle control module, etc. The vehicle unlocking authentication apparatus can control the vehicle external Bluetooth module and the terminal device to achieve Bluetooth connection to realize the operation of sending an authentication request by terminal device to the terminal device via Bluetooth, and also store the device feature information of the terminal device bound to the vehicle unlocking authentication apparatus, so as to enable the terminal device to be correctly connected with the vehicle unlocking authentication apparatus.

In the embodiments of the present disclosure, when the terminal device is in the range of Bluetooth connection with the vehicle unlocking authentication apparatus, the authentication request can be sent to the vehicle unlocking authentication apparatus via Bluetooth, and the vehicle unlocking authentication apparatus can be enabled to perform the authentication operation to the terminal device through the authentication request. And only after passing the authentication of the terminal device, the user of the terminal device can implement the control to the current vehicle. In addition, the authentication request may include information such as the device fingerprint of the terminal device and the first authentication code generated by the terminal device and so on.

In the embodiments of the present disclosure, the first authentication code may be a Hash-based Message Authentication Code (HMAC), and the terminal device may calculate and generate the corresponding first authentication code according to its own device fingerprint and service key.

Optionally, the method for the terminal device to calculate and generate the corresponding first authentication code according to its own device fingerprint and service key, may be: when the terminal device detects the input unlocking/locking instruction, the terminal device can obtain the device feature information of the terminal device, and the device feature information may include at least the device fingerprint and service key of the terminal device; and the terminal device may calculate and obtain the first authentication code according to the device fingerprint and the service key. In addition, the terminal device may also send an authentication request including the device fingerprint and the first authentication code to the vehicle unlocking authentication apparatus. Among them, any one terminal device can correspond to unique device feature information, which can include the device fingerprint and service key of the terminal device. The device fingerprint can be used to uniquely identify the device feature of the terminal device, so that the terminal device can be uniquely determined according to the device fingerprint. The service key can be a service public-private key pair or a service symmetric key, where the service key can perform signature and encryption operation on the device feature information during the binding process of the terminal device and the vehicle unlocking authentication apparatus, so that the service key-based signed and encrypted device feature information, which is stored in the vehicle unlocking authentication apparatus, can be verified by the terminal device storing the service key.

102. The vehicle unlocking authentication apparatus searches for a prestored service key corresponding to the device fingerprint, and calculates and obtains a second authentication code according to the device fingerprint and the service key.

In the embodiment of the present disclosure, the vehicle unlocking authentication apparatus may store the device feature information of the terminal device in advance during the binding phase of the terminal device and the vehicle unlocking authentication apparatus, where the device feature information may include the device fingerprint, service key and other information of the terminal device. Therefore, the vehicle unlocking authentication apparatus can search for the service key corresponding to the device fingerprint included in the authentication request. If the vehicle unlocking authentication apparatus does not search the service key corresponding to the service fingerprint, it can be considered that the terminal device is not bound with the vehicle unlocking authentication apparatus, therefore, the vehicle unlocking authentication apparatus can confirm that the authentication of the terminal device has not been passed.

In the embodiment of the present disclosure, the vehicle unlocking authentication apparatus may calculate and obtain the second authentication code according to the device fingerprint and the service key through the vehicle external Bluetooth module, and the second authentication code may also be HMAC.

103. The vehicle unlocking authentication apparatus determines a third authentication code and a fourth authentication code based on the first authentication code, the second authentication code, the device fingerprint, and the service key, so as to complete a vehicle unlocking authentication by the terminal device.

As an optional implementation, the method, that the vehicle unlocking authentication apparatus determines the third authentication code and the fourth authentication code based on the first authentication code, the second authentication code, the device fingerprint, and the service key, so as to complete the vehicle unlocking authentication by the terminal device, can include the following steps:

when it is detected that the first authentication code is the same as the second authentication code, the vehicle unlocking authentication apparatus calculates the randomly generated first random number and the service key to obtain the exclusive OR value; the vehicle unlocking authentication apparatus sends the first response including the exclusive OR value to the terminal device, so as to enable the terminal device to calculate and obtain the third authentication code according to the first response, and feeds back the second response containing the third authentication code; when the second response is received, the vehicle unlocking authentication apparatus calculates and obtains the fourth authentication code according to the device fingerprint, the service key and the first random number; when it is detected that the third authentication code and the fourth authentication code are the same, the vehicle unlocking authentication apparatus confirms the completion of the vehicle unlocking authentication by the terminal device.

Among them, by implementing the implementation, the calculated and obtained exclusive OR value can be sent to the terminal device, so as to enable the terminal device to feed back the fourth authentication code obtained according to the exclusive OR value, and then realize the vehicle unlocking authentication by the terminal device according to the third authentication code and the fourth authentication code, so as to realize the vehicle unlocking authentication by the terminal device through the third authentication code generated by the terminal device and the fourth authentication code generated by the vehicle together, which ensures the reliability of unlocking the vehicle by the terminal device.

In the embodiment of the present disclosure, the first authentication code and the second authentication code are both calculated and obtained through the device fingerprint and the service key, and the device fingerprint used in the calculation of the terminal device and the vehicle unlocking authentication apparatus are the same. If the service key of the terminal device is the same as the service key of the vehicle unlocking authentication apparatus, the first authentication code and the second authentication code should be the same. If the first authentication code and the second authentication code are not the same, the vehicle unlocking authentication apparatus can consider that the terminal device is not bound with the vehicle unlocking authentication apparatus, and then it is determined that the terminal device does not pass the authentication. In addition, the vehicle unlocking authentication apparatus may perform an exclusive OR operation on the first random number and the service key to obtain the exclusive OR value. The terminal device may calculate and obtain the third authentication number according to the exclusive OR value contained in the first response, the device fingerprint and the service key, and the third authentication code can also be HMAC. In addition, the vehicle unlocking authentication apparatus obtains the fourth authentication code through the hash operation according to the device fingerprint, the service key, and the first random number through the vehicle external Bluetooth module, that is, the fourth authentication code may also be HMAC.

Optionally, the method that the terminal device calculates and obtains the third authentication code and feeds back the second response containing the third authentication code can be: the terminal device can read the exclusive OR value from the received first response; and calculate and obtain the third authentication code according to exclusive OR value and the feature information of device; and add the third authentication code to the second response, and feed the second response containing the third authentication code to the vehicle unlocking authentication apparatus, so as to enable the vehicle unlocking authentication apparatus to perform authentication on the terminal device according to the second response.

The method described in FIG. 1 can improves the safety for transmitting data during the authentication process between the vehicle and the terminal device. In addition, implementation of the method described in FIG. 1 ensures the reliability of unlocking the vehicle by the terminal device.

Embodiment 2

Figure 2:
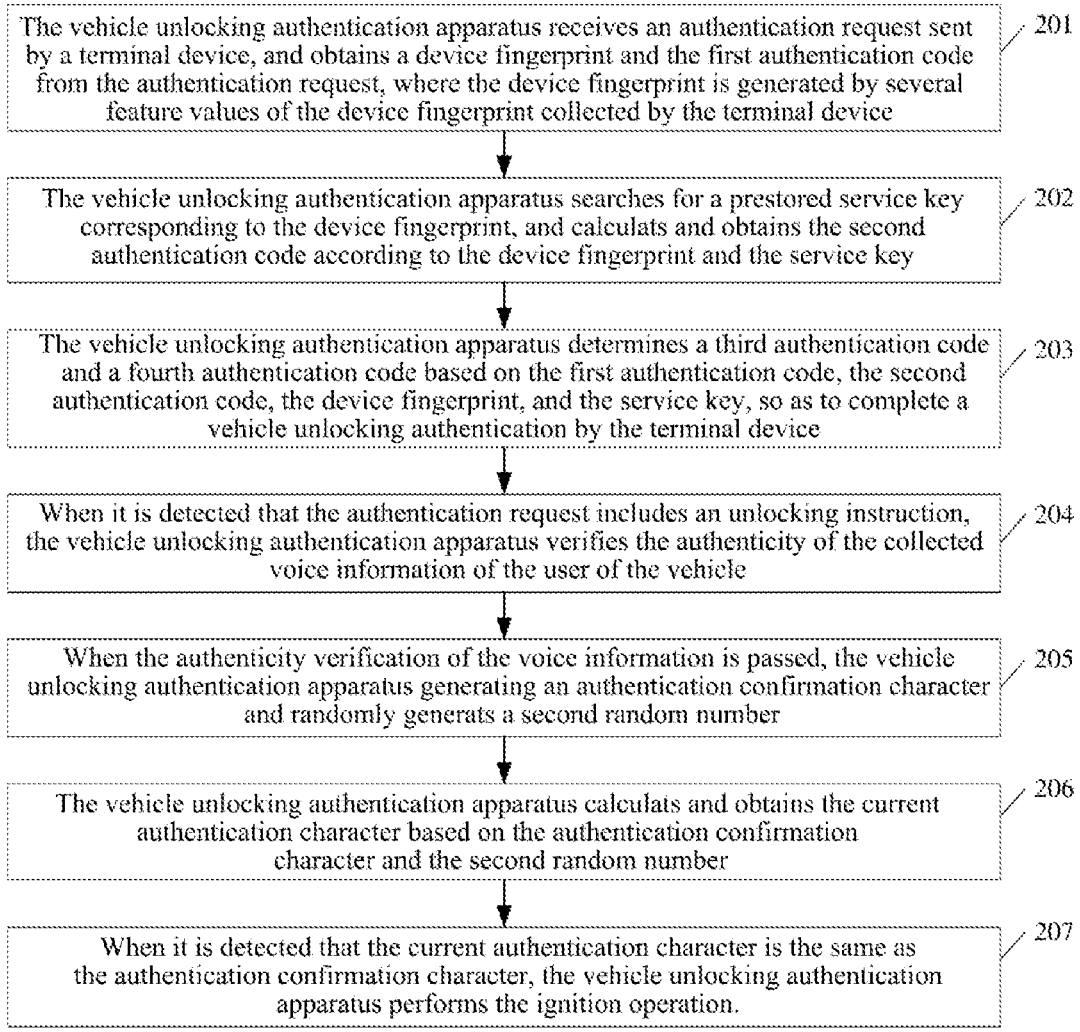
FIG. 2 is a schematic flowchart of another vehicle unlocking authentication method based on a terminal device disclosed by an embodiment of the present disclosure.

Please refer to FIG. 2, which is a schematic flowchart of another vehicle unlocking authentication method based on a terminal device disclosed by an embodiment of the present disclosure. Compared with the first embodiment, the embodiment of the present disclosure adds the safety verification before the ignition operation can be performed on the vehicle after the authentication of the terminal device, such as voice identification and unlocking authentication and other operations on the vehicle, thereby improving the safety of the vehicle. As shown in FIG. 2, the method for vehicle unlocking authentication based on a terminal device may include the following steps:

201. The vehicle unlocking authentication apparatus receives an authentication request sent by a terminal device, and obtains a device fingerprint and a first authentication code from the authentication request, where the device fingerprint is generated by several feature values of the device fingerprint collected by the terminal device.

In the embodiment of the present disclosure, the terminal device can collect several feature values of the device fingerprint of the terminal device. Taking a mobile phone as an example for illustration, the feature value of device fingerprint can be identification information, such as the name, model, serial number, hardware version, Mobile Equipment Identifier (MEID), International Mobile Equipment Identity (IMEI), and mobile phone number, etc., of the device, and the device fingerprint of the terminal device can be generated with not less than 200 device fingerprint feature values. In addition, the device fingerprint can be used to uniquely identify the device feature of the terminal device, that is, the terminal device can be uniquely determined according to the device fingerprint, thereby improving the accuracy of verifying the identity of the terminal device.

202. The vehicle unlocking authentication apparatus searches for a prestored service key corresponding to the device fingerprint, and calculates and obtains a second authentication code according to the device fingerprint and the service key.

Among them, the device fingerprint and the service key are stored in a one-to-one correspondence.

203. The vehicle unlocking authentication apparatus determines a third authentication code and a fourth authentication code based on the first authentication code, the second authentication code, the device fingerprint, and the service key, so as to complete a vehicle unlocking authentication by the terminal device.

204. When it is detected that the authentication request includes an unlocking instruction, the vehicle unlocking authentication apparatus verifies the authenticity of the collected voice information of the user of the vehicle.

In the embodiment of the present disclosure, the voice information may include the voiceprint information and/or semantic information of the user. If the voiceprint information of the user can be obtained from the voice information, the voiceprint can be verified to enable the vehicle unlocking authentication apparatus to detect whether the user corresponding to the voiceprint has the authority to start the ignition configuration. If the voice print is the same as the prestored voiceprint used to start the ignition configuration, it can be considered that the user corresponding to the voiceprint has the authority to start the ignition configuration, that is, the voice information has passed the authenticity verification; if the semantic information input by the user can be obtained from the voice information, the text information of the voice start ignition configuration prestored in the vehicle unlocking authentication apparatus can be determined, and compare the identified semantic information with the text information, if the semantic information is the same as the text information, it can be considered that the current user has the authority to start the ignition configuration, that is, the voice information has passed the authenticity verification.

As an optional implementation, before performing step 204, the vehicle unlocking authentication apparatus may further perform the following steps:

the vehicle unlocking authentication apparatus transmits anti-theft authentication instructions to the vehicle body control module of the vehicle unlocking authentication apparatus through the vehicle external Bluetooth module; the vehicle unlocking authentication apparatus performs anti-theft authentication on the vehicle through the vehicle body control module; when the anti-theft authentication of the vehicle is passed, the vehicle unlocking authentication apparatus feeds back the anti-theft authentication pass information through the vehicle body control module to the vehicle external Bluetooth module; when the vehicle external Bluetooth module receives the anti-theft authentication pass information, the vehicle unlocking authentication apparatus detects whether the authentication request contains the unlocking instruction.

Among them, implementing the implementation can perform the anti-theft authentication on the vehicle through the vehicle body control module, and only after passing the anti-theft authentication, can further operations corresponding to the unlocking/locking instruction perform, thereby ensuring the safety of the current vehicle.

In the embodiment of the present disclosure, the content of the anti-theft authentication may contain detecting whether the door of the current vehicle is opened illegally, whether the window of the current vehicle is opened illegally, etc. If there are no operations such as illegal opening of the door or illegal opening of the window of the current vehicle, etc., it can be considered that the current vehicle has passed anti-theft authentication.

205. When the authenticity verification of the voice information is passed, the vehicle unlocking authentication apparatus generates an authentication confirmation character and randomly generates a second random number.

In the embodiment of the present disclosure, the target semantics can be identified in the voice information, and the vehicle unlocking authentication apparatus needs to collect voice information containing specific semantics. Only when the user of the terminal device is in the current vehicle, the user can speak with the voice containing identified semantics, thereby ensuring accuracy of the user; in addition, the authentication confirmation character can be ACK (Acknowledgement, confirmation character), which enables the vehicle unlocking authentication apparatus to authenticate the voice identification process according to the authentication confirmation character and the second random number together.

206. The vehicle unlocking authentication apparatus calculates and obtains the current authentication character based on the authentication confirmation character and the second random number.

In the embodiment of the present disclosure, the vehicle unlocking authentication apparatus calculates and obtains the current authentication character based on the authentication confirmation character and the second random number, which can be realized by the voice identification module and the safety module of the vehicle unlocking authentication apparatus together. The on-board electronic device can generate the authentication confirmation character through the voice identification module and randomly generate the third random number, and can also perform the exclusive OR calculation through the voice identification module according to the third random number and the authentication confirmation character to obtain the authentication code after the exclusive OR, and can send a voice identification request containing authentication confirmation character, authentication code and the third random number to the safety module of the vehicle unlocking authentication apparatus through the voice identification module; and the current authentication character is calculated and obtained though the safety module according to the authentication code and the third random number. In addition, since the current confirmation character is obtained by the exclusive OR of the third random number and the authentication code, if the data transmission between the voice identification module and the safety module is correct, the current confirmation character obtained can be the same as the authentication code.

207. When it is detected that the current authentication character is the same as the authentication confirmation character, the vehicle unlocking authentication apparatus performs the ignition operation.

In the embodiment of the present disclosure, before the vehicle performs the ignition operation, it can judge whether the vehicle has reached the ignition starting condition, and the method that judging whether the vehicle has reached the ignition starting condition can be: detecting whether the vehicle is opened for door and powered on; if the vehicle is opened for door and powered on, detecting whether the brake pedal of the vehicle is depressed; if the brake pedal of the vehicle is depressed, checking whether the Bluetooth key is connected to the vehicle unlocking authentication apparatus; if connected, checking whether the anti-theft authentication of the vehicle external Bluetooth module is passed and whether the anti-theft authentication of the vehicle body control module is passed; if the anti-theft authentication of the vehicle external Bluetooth module is passed and the anti-theft authentication of the vehicle body control module is passed, checking whether the unlocking duration of the Bluetooth key unlocking the vehicle is less than the preset time (for example, the preset time can be three minutes, etc.) or whether the semantic identification for the user is completed; if the unlocking duration is less than the preset time or the semantic identification for the user has been completed, detecting whether the vehicle is currently not ignited and started. If the vehicle is not ignited and started, the vehicle can be considered to meet the ignition starting condition, and then the complete vehicle control unit of the vehicle unlocking authentication apparatus can be triggered to trigger the ignition operation of the vehicle. Among them, only either one of the two conditions, that the unlocking duration of the Bluetooth key is less than the preset time and the semantic identification for the user has been completed, can be realized.

In the embodiment of the present disclosure, by implementing the above steps 204 to 207, the authenticity of the voice information of the user of the vehicle can be verified. Only after passing the authenticity verification of the voice information, can the vehicle be controlled to further start the ignition and other operations, which ensures that the user of the terminal device matches with the user information prestored in the vehicle.

The method described in FIG. 2 can improve the safety for transmitting data during the authentication process between the vehicle and the terminal device. In addition, implementation of the method described in FIG. 2 ensures the safety of the current vehicle. In addition, implementation of the method described in FIG. 2 ensures that the user of the terminal device matches with the user information prestored in the vehicle.

The Third Embodiment

Figure 3:
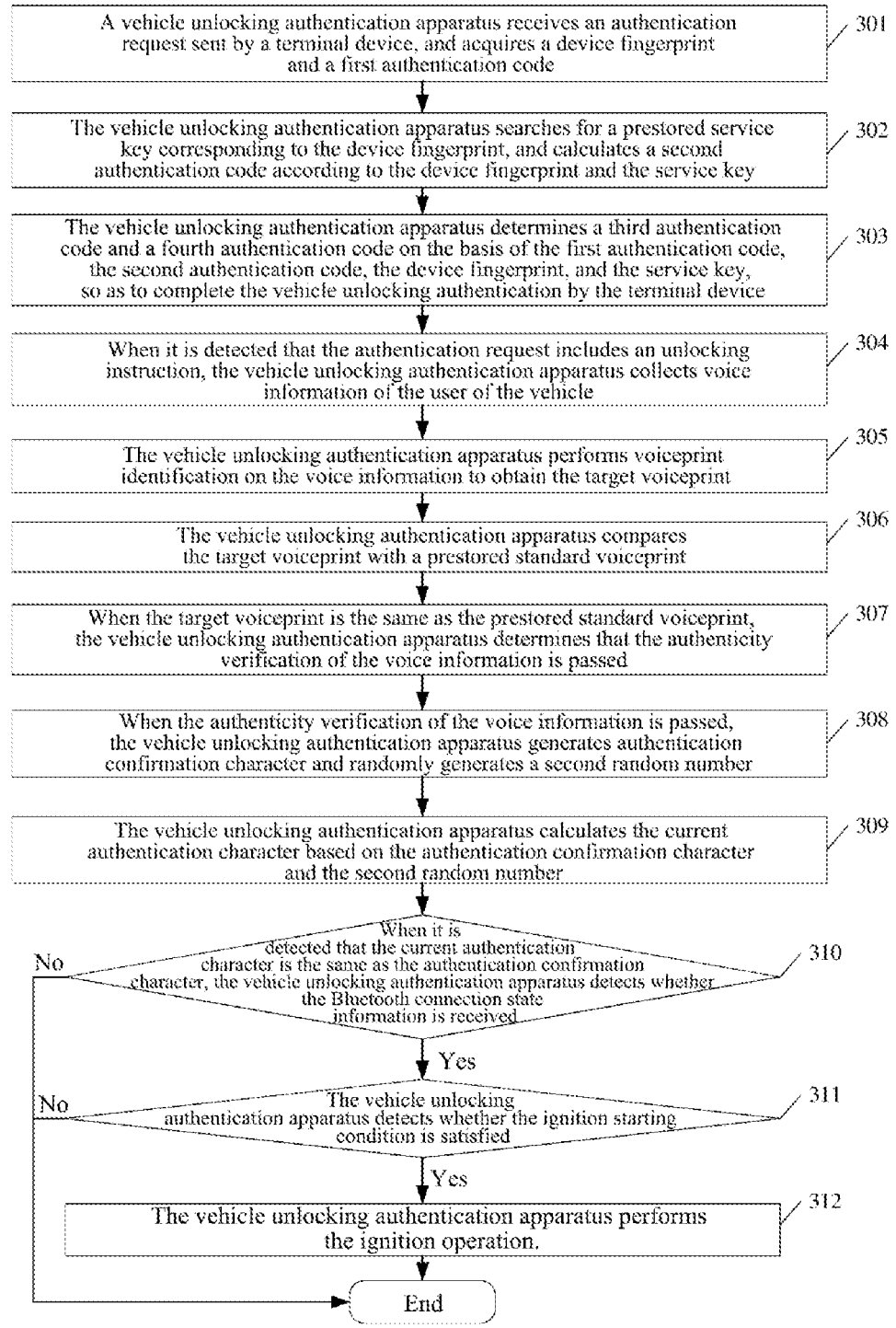
FIG. 3 is a schematic flowchart of another vehicle unlocking authentication method based on a terminal device disclosed by an embodiment of the present disclosure.

Please refer to FIG. 3, which is a schematic flowchart of another vehicle unlocking authentication method based on a terminal device disclosed by an embodiment of the present disclosure. Compared with the second embodiment, the embodiment of the present disclosure explains in more detail the method of voice identification and the method of calculating and obtaining the current authentication character, which increases the judgment of whether the vehicle meets the ignition starting condition, improves the safety of triggering the ignition of the vehicle, and improves the accuracy of the authentication code and the current authentication character calculation. As shown in FIG. 3, the vehicle unlocking authentication method based on a terminal device may include the following steps:

step 301 to step 303 are the same as step 101 to step 103, and will not be repeated in this embodiment of the present disclosure.

304. When it is detected that the authentication request includes an unlocking instruction, the vehicle unlocking authentication apparatus collects voice information of the user of the vehicle.

As an optional implementation, the method that the vehicle unlocking authentication apparatus collects the voice information of the user of the vehicle may include the following steps:

the vehicle unlocking authentication apparatus can output a voice collection prompt, which may contain semantic information that the user of the vehicle needs to talk, through the voice identification module; the vehicle unlocking authentication apparatus can collect the voice output by the user of the vehicle through the voice identification module; the vehicle unlocking authentication apparatus can extract the user's voiceprint information from the voice through the voice identification module, and identify the target semantics contained in the voice; the vehicle unlocking authentication apparatus can generate the voice information containing the user's voiceprint information and target semantics through the voice identification module.

Among them, implementing the implementation can prompt the user to speak the corresponding voice according to the voice information in the voice collection prompt, so as to enable the vehicle unlocking authentication apparatus to identify the location of the current user according to the corresponding different semantics in different time or space during the voice identification process, and jointly determine that the user corresponding to the terminal device is located on the current vehicle according to the voiceprint information, thereby ensuring the accuracy of user identification of the vehicle.

305. The vehicle unlocking authentication apparatus performs voiceprint identification on the voice information to obtain the target voiceprint.

306. The vehicle unlocking authentication apparatus compares the target voiceprint with a prestored standard voiceprint.

307. When the target voiceprint is the same as the prestored standard voiceprint, the vehicle unlocking authentication apparatus determines that the authenticity verification of the voice information is passed.

In the embodiment of the present disclosure, by implementing the above step 304 to step 307, the voice information of the user currently unlocking can be collected, and the voiceprint can be identified from the semantic information. If the voiceprint is detected to be the same as the prestored standard voiceprint, and it can be considered that the user corresponding to the voiceprint has the authority to start the ignition configuration, thereby improving the safety of triggering the vehicle ignition.

308. When the authenticity verification of the voice information is passed, the vehicle unlocking authentication apparatus generates authentication confirmation character and randomly generates a second random number.

309. The vehicle unlocking authentication apparatus calculates and obtains the current authentication character based on the authentication confirmation character and the second random number.

As an optional implementation, the method that the vehicle unlocking authentication apparatus calculates and obtains the current authentication character based on the authentication confirmation character and the second random number, may include the following steps:

the vehicle unlocking authentication apparatus performs exclusive OR calculation on the authentication confirmation character and the second random number to obtain an authentication code; the vehicle unlocking authentication apparatus performs exclusive OR calculation on the authentication code and the second random number to obtain the current authentication character.

Among them. implementing the implementation can calculate and obtain the authentication code and the current authentication character through the exclusive OR method, so as to enable the calculation method of the authentication code and the current authentication character to be clearer, and also improve the accuracy of the calculation of the authentication code and the current authentication character.

310. When it is detected that the current authentication character are the same as the authentication confirmation character, the vehicle unlocking authentication apparatus detects whether the Bluetooth connection state information is received, and if yes, execute step 311; if not, end this process.

311. The vehicle unlocking authentication apparatus detects whether the ignition starting condition is satisfied, if yes, execute step 312; if not, end this process.

312. The vehicle unlocking authentication apparatus performs the ignition operation.

In the embodiment of the present disclosure, by implementing the above step 310 to step 312, the Bluetooth connection state information and the ignition condition can be detected. Only under the condition that the Bluetooth connection state information and the ignition condition are both detected to be satisfied, can the vehicle perform the ignition operation, thus ensuring the safety of the vehicle during the ignition process.

As an optional implementation, the method that the vehicle unlocking authentication apparatus performs the ignition operation may include the following steps:

the vehicle unlocking authentication apparatus obtains the unlocking duration of the vehicle; the vehicle unlocking authentication apparatus judges whether the unlocking duration is greater than the preset unlocking duration; if the unlocking duration is less than or equal to the preset unlocking duration, the vehicle unlocking authentication apparatus confirms that the ignition starting condition is satisfied; if the unlocking duration is greater than the preset unlocking duration, the vehicle unlocking authentication apparatus judges whether the safety module of the vehicle receives the authentication confirmation character; if the authentication confirmation character is received, the vehicle unlocking authentication apparatus confirms that the ignition starting condition is satisfied.

Among them, implementing the implementation can confirm that the ignition starting condition is satisfied under the condition that the unlocking duration of the vehicle does not reach the preset maximum duration, and can also confirm that the ignition starting condition is satisfied under the condition that the safety module of the vehicle receives the authentication confirmation character, so as to enable the judging method of ignition starting condition to be more diversified, and improve the starting probability of the ignition starting condition.

Optionally, the embodiment of the present disclosure can also realize the vehicle locking authentication through the terminal device, and the method that realizing the vehicle locking authentication through the terminal device may include the following steps:

when the terminal device detects the locking instruction input by the user, the terminal device can obtain the device feature information of the terminal device, which can at least include the device fingerprint and service key of the terminal device; the terminal device can calculate and obtain the fifth authentication code according to the device fingerprint and service secret key; the terminal device can send an authentication request containing the device fingerprint and the fifth authentication code to the locking authentication apparatus of the vehicle;

when the vehicle external Bluetooth module of the locking authentication apparatus of the vehicle receives the authentication request sent by the terminal device, the locking authentication apparatus can read the device fingerprint and the fifth authentication code from the authentication request through the vehicle external Bluetooth module; the locking authentication apparatus can search for the prestored service key corresponding to the device fingerprint through the vehicle external Bluetooth module, and calculate and obtain the sixth authentication code based on the device fingerprint and service key; when it is determined that the fifth authentication code is the same as the sixth authentication code, the locking authentication apparatus can calculate the randomly generated fourth random number and the service key through the vehicle external Bluetooth module to obtain the current exclusive OR value; the locking authentication apparatus can send the third response containing the current exclusive OR value to the terminal device through the vehicle external Bluetooth module.

When detecting the third response sent by the vehicle unlocking authentication apparatus, the terminal device reads the current exclusive OR value from the third response; the terminal device can perform exclusive OR on the current exclusive OR value and the service key to obtain the fifth random number; the terminal device can calculate and obtain the seventh authentication code, according to the fifth random number and the device fingerprint and service key contained in the device feature information; the terminal device can send a third response containing the seventh authentication code to the locking authentication apparatus.

when the vehicle external Bluetooth module of the locking authentication apparatus receives the third response containing the seventh authentication code sent by the terminal device, the locking authentication apparatus can calculate and obtain the eighth authentication code through the vehicle external Bluetooth module according to the device fingerprint, the service key and the fourth random number; when the seventh authentication code is the same as the eighth authentication code, the locking authentication apparatus can confirm that the authentication of the terminal apparatus has passed through the vehicle external Bluetooth module; the locking authentication apparatus can transmit anti-theft authentication instructions to the vehicle body control module of the vehicle locking authentication apparatus through the vehicle external Bluetooth module; the locking authentication apparatus can perform anti-theft authentication on the vehicle through the vehicle body control module; when the anti-theft authentication of the vehicle is passed, the locking authentication apparatus can feed back the anti-theft authentication pass information to the vehicle external Bluetooth module through the vehicle body control module; when the vehicle external Bluetooth module of the locking authentication apparatus receives the anti-theft authentication pass information, the locking authentication apparatus can transmit the locking instruction included in the authentication request to the vehicle body control module through the vehicle external Bluetooth module, so as to the vehicle body control module can detect whether the vehicle meets the locking condition; if the locking condition is met, the locking authentication apparatus can lock and power off the vehicle through the vehicle body control module, and then perform the flameout operation, in order to realize the locking operation of the vehicle.

Among them, through the above-mentioned locking operation, both the unlocking operation of the vehicle and the locking operation of the vehicle can be realized based on the Bluetooth key of the terminal device, which improves the degree of control of the vehicle by the terminal device.

In the method described in FIG. 3, it can improve the safety for transmitting data during the authentication process between the vehicle and the terminal device. In addition, the implementation of the method described in FIG. 3 ensures the accuracy of user identification of the vehicle. In addition, the implementation of the method described in FIG. 3 improves the safety of triggering vehicle ignition. In addition, the implementation of the method described in FIG. 3 improves the accuracy of the authentication code and current authentication character calculation. In addition, the implementation of the method described in FIG. 3 ensures the safety of the vehicle during ignition. In addition, the implementation of the method described in FIG. 3 improves the starting probability of ignition starting condition. In addition, the implementation of the method described in FIG. 3 improves the degree of control of the vehicle by the terminal device.

Embodiment 4

Figure 4A:
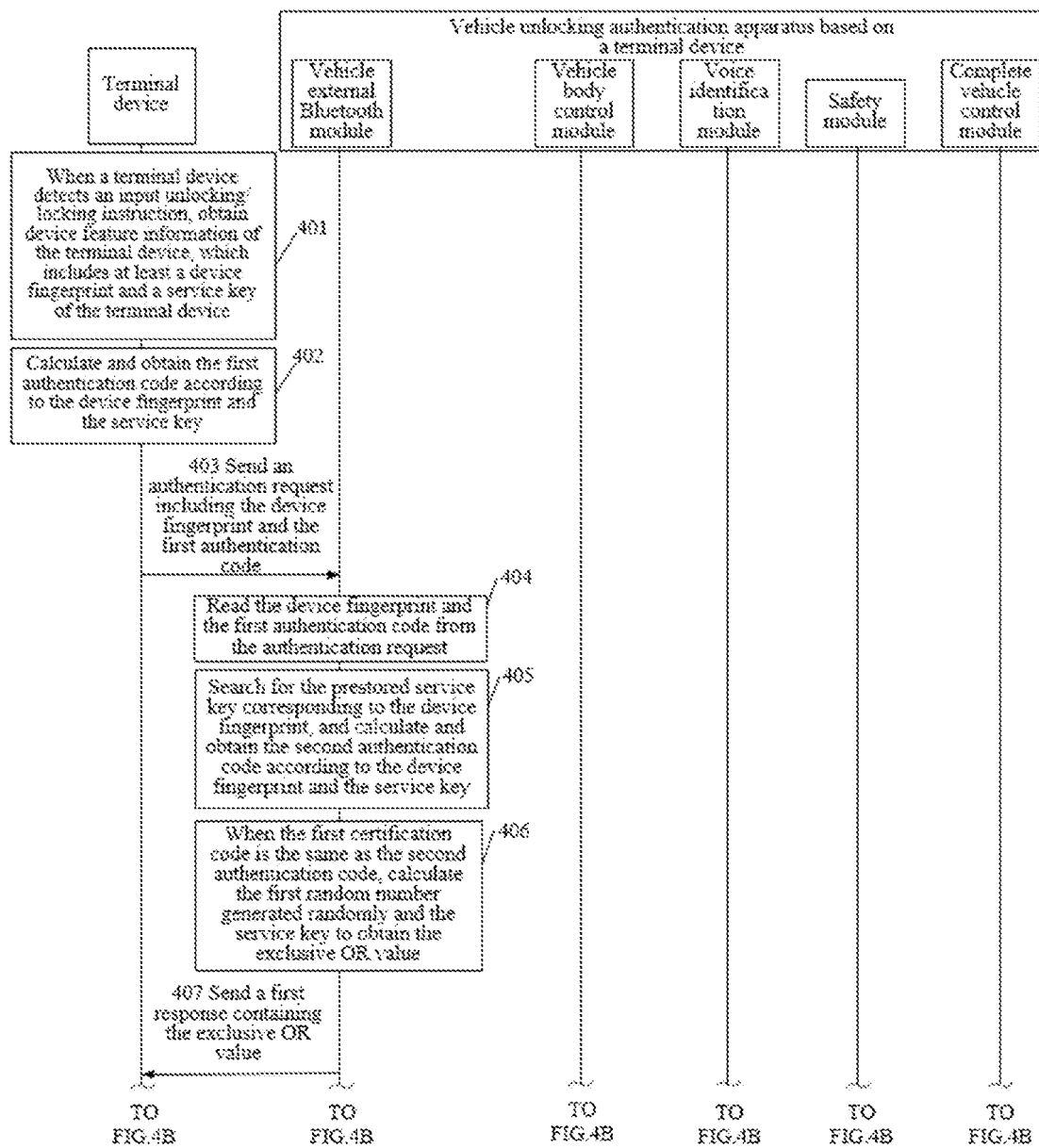
FIG. 4A to FIG. 4C are schematic flowcharts of another vehicle unlocking authentication method based on a terminal device disclosed by an embodiment of the present disclosure.
Figure 4B:
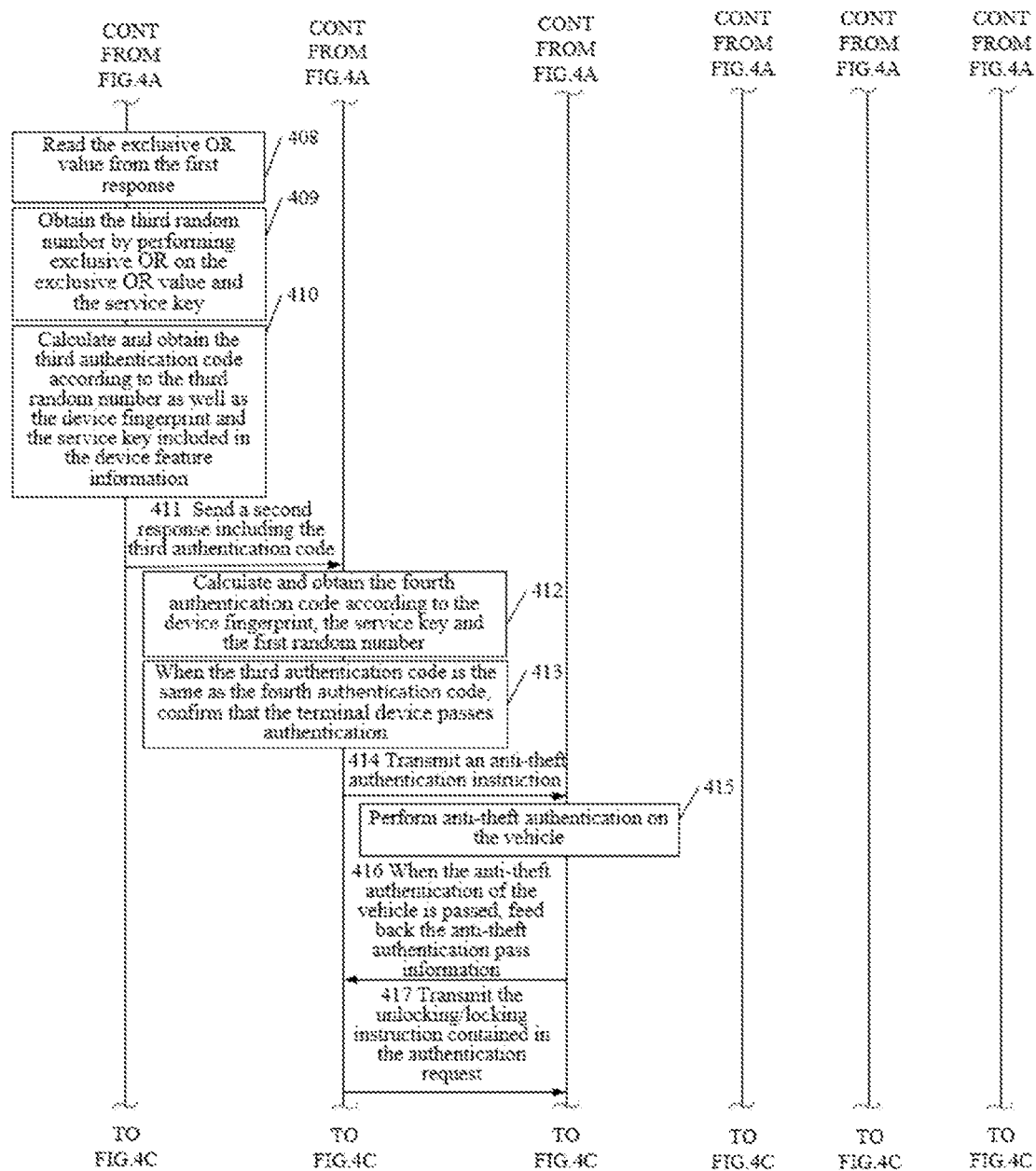
Figure 4C:
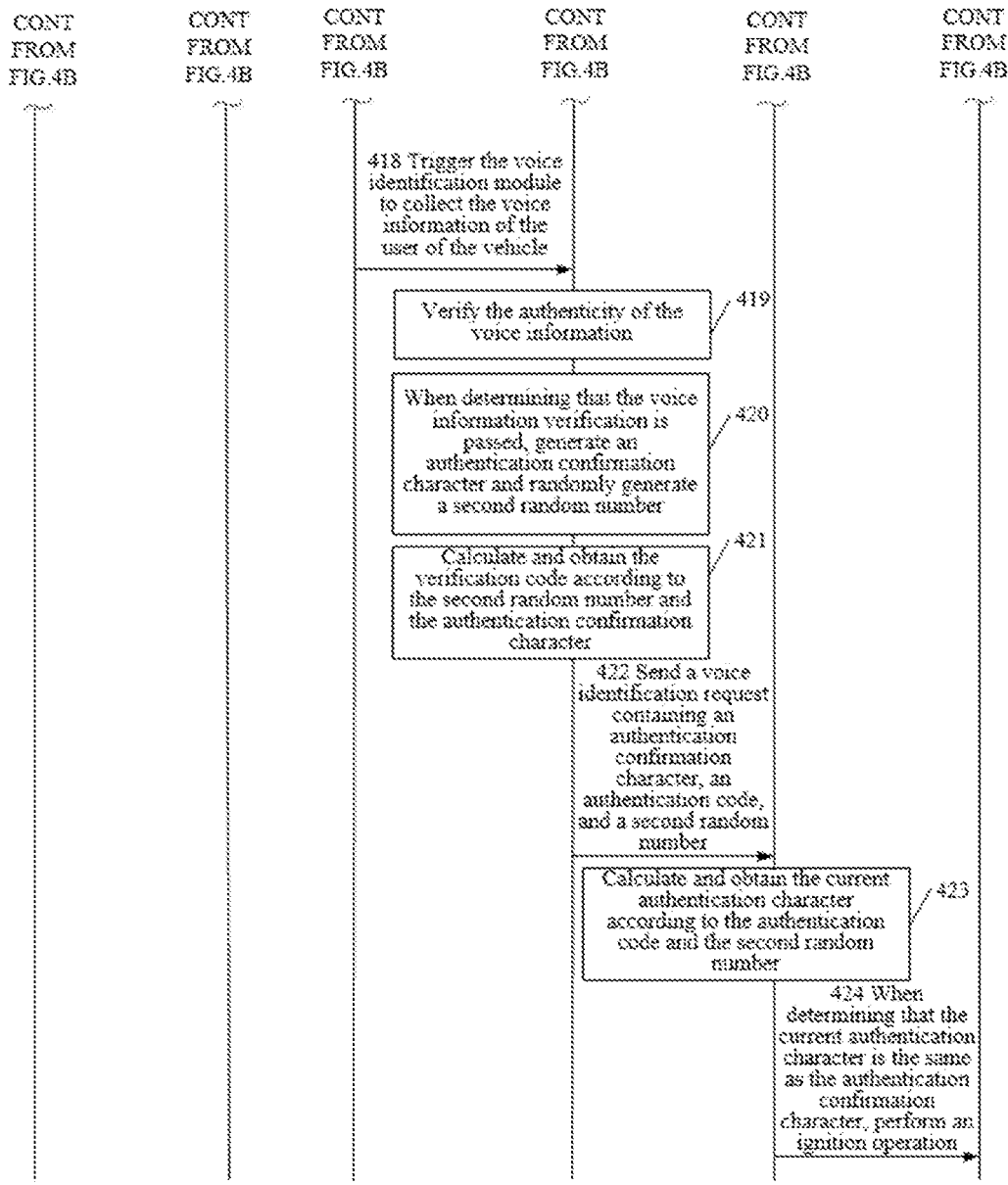

Please refer to FIG. 4A to FIG. 4C, which are schematic flowcharts of another vehicle unlocking authentication method based on a terminal device disclosed by an embodiment of the present disclosure. As shown in FIG. 4A to FIG. 4C, the terminal device authentication method may involve a vehicle unlocking authentication apparatus based on a terminal device set on the vehicle and a terminal device, where the vehicle unlocking authentication apparatus based on a terminal device may include a vehicle external Bluetooth module, a vehicle body control module, a voice identification module, a safety module, a complete vehicle control module, etc., and the vehicle unlocking authentication method based on the terminal device may include the following steps:

401. When a terminal device detects an input unlocking/locking instruction, the terminal device obtains device feature information of the terminal device, which includes at least a device fingerprint and a service key of the terminal device.

402. The terminal device calculates and obtains the first authentication code according to the device fingerprint and the service key.

403. The terminal device sends an authentication request including the device fingerprint and the first authentication code to the vehicle unlocking authentication apparatus based on a terminal device.

404. When the vehicle external Bluetooth module of the vehicle unlocking authentication apparatus based on a terminal device receives the authentication request sent by the terminal device, the vehicle unlocking authentication apparatus based on the terminal device reads the device fingerprint and the first authentication code from the authentication request through the vehicle external Bluetooth module.

405. The vehicle unlocking authentication apparatus based on a terminal device searches for the prestored service key corresponding to the device fingerprint through the vehicle external Bluetooth module, and calculates and obtains the second authentication code according to the device fingerprint and the service key.

406. When the first authentication code is the same as the second authentication code, the vehicle unlocking authentication apparatus based on a terminal device calculates the first random number generated randomly and the service key through the vehicle external Bluetooth module to obtain the exclusive OR value.

407. The vehicle unlocking authentication apparatus based on a terminal device sends a first response containing the exclusive OR value to the terminal device through the vehicle external Bluetooth module.

408. When detecting the first response sent by the vehicle unlocking authentication apparatus, the terminal device reads the exclusive OR value from the first response.

409. The terminal device obtains the third random number by performing exclusive OR on the exclusive OR value and the service key.

410. The terminal device calculates and obtains the third authentication code according to the third random number as well as the device fingerprint and the service key contained in the device feature information.

411. The terminal device sends a second response containing the third authentication code to the vehicle unlocking authentication apparatus based on a terminal device.

412. When the vehicle external Bluetooth module of the vehicle unlocking authentication apparatus based on a terminal device receives the second response containing the third authentication code sent by the terminal device, the vehicle unlocking authentication apparatus based on the terminal device calculates and obtains the fourth authentication code through the vehicle external Bluetooth module according to the device fingerprint, the service key and the first random number.

413. When the third authentication code is the same as the fourth authentication code, the vehicle unlocking authentication apparatus based on a terminal device confirms that the terminal device passes authentication through the vehicle external Bluetooth module.

414. The vehicle unlocking authentication apparatus based on a terminal device transmits an anti-theft authentication instruction to the vehicle body control module of the vehicle unlocking authentication apparatus through the vehicle external Bluetooth module.

415. The vehicle unlocking authentication apparatus based on a terminal device performs anti-theft authentication on the vehicle through the vehicle body control module.

416. When the anti-theft authentication of the vehicle is passed, the vehicle unlocking authentication apparatus based on a terminal device feeds back the anti-theft authentication pass information to the vehicle external Bluetooth module through the vehicle body control module.

417. When the vehicle external Bluetooth module of the vehicle unlocking authentication apparatus based on a terminal device receives the anti-theft authentication pass information, the vehicle unlocking authentication apparatus based on a terminal device transmits the unlocking/locking instruction contained in the authentication request to the vehicle body control module through the vehicle external Bluetooth module, to make the vehicle body control module execute the operation corresponding to the unlocking/locking instruction.

418. When the vehicle body control module detects that the authentication request contains an unlocking instruction, the vehicle unlocking authentication apparatus based on a terminal device triggers the voice identification module to collect the voice information of the user of the vehicle through the vehicle body control module.

419. The vehicle unlocking authentication apparatus based on a terminal device verifies the authenticity of the voice information through the voice identification module.

420. When the voice identification module determines that the voice information verification is passed, the vehicle unlocking authentication apparatus based on a terminal device generates an authentication confirmation character through the voice identification module, and randomly generates a second random number.

421. The vehicle unlocking authentication apparatus based on a terminal device calculates and obtains the authentication code according to the second random number and the authentication confirmation character through the voice identification module.

422. The vehicle unlocking authentication apparatus based on a terminal device sends a voice identification request containing an authentication confirmation character, an authentication code, and a second random number to the safety module of the vehicle unlocking authentication apparatus based on a terminal device through the voice identification module.

423. The vehicle unlocking authentication apparatus based on a terminal device calculates and obtains the current authentication character through the safety module according to the authentication code and the second random number.

424. When the safety module determines that the current authentication character is the same as the authentication confirmation character, the vehicle unlocking authentication apparatus based on a terminal device performs an ignition operation through the complete vehicle control module.

It can be seen that by implementing the terminal device authentication method described in FIG. 4A to FIG. 4C, the authentication code and the exclusive OR value can be generated according to the device feature information, so that the authentication code and the exclusive OR value are transmitted between the vehicle unlocking authentication apparatus based on a terminal device and the terminal device. Furthermore, realize the authentication of the terminal device according to the authentication code and the exclusive OR value, so that the vehicle unlocking authentication apparatus based on a terminal device and the terminal device transmit the calculated data therebetween, thereby improving the safety for transmitting data during the authentication process of the vehicle unlocking authentication apparatus based on a terminal device of the vehicle to the terminal device.

Embodiment 5

Figure 5:
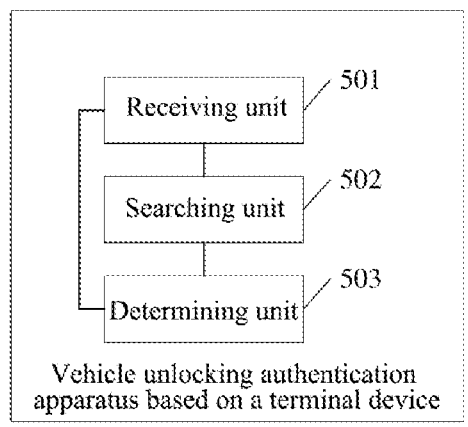
FIG. 5 is a schematic structural diagram of a vehicle unlocking authentication apparatus based on a terminal device disclosed by an embodiment of the present disclosure.

Please refer to FIG. 5, FIG. 5 is a schematic structural diagram of a vehicle unlocking authentication apparatus based on a terminal device disclosed by an embodiment of the present disclosure. As shown in FIG. 5, the vehicle unlocking authentication apparatus based on a terminal device may comprise:

a receiving unit 501, configured to receive an authentication request sent by the terminal device, to obtain a device fingerprint and a first authentication code.

As an optional implementation, the method that the receiving unit 501 receives the authentication request sent by the terminal device, and obtains the device fingerprint and the first authentication code, specifically may be:

receiving the authentication request sent by the terminal device, and obtaining the device fingerprint and the first authentication code from the authentication request, where the device fingerprint is generated through several feature values of the device fingerprint collected by the terminal device.

Among them, through implementing the implementation, the terminal device can collect several feature values of the device fingerprint of the terminal device. Taking a mobile phone as an example, the feature value of the device fingerprint can be the identification information such as the name, model, serial number, hardware version, MEID, IMEI, and phone number etc., of the device, and the device fingerprint of the terminal device can be generated with not less than 200 feature values of the device fingerprint. In addition, the device fingerprint can be used to uniquely identify the device feature of the terminal device, that is, the terminal device can be uniquely determined according to the device fingerprint, thereby improving the accuracy of verifying the identity of the terminal device.

A searching unit 502 is configured to search for a pre-stored service key corresponding to the device fingerprint obtained by the receiving unit 501, and calculate and obtain the second authentication code according to the device fingerprint and the service key.

Among them, the device fingerprint and the service key are stored in a one-to-one correspondence.

A determining unit 503 is configured to determine a third authentication code and a fourth authentication code based on the first authentication code obtained by the receiving unit 501, the second authentication code obtained by the searching unit 502, the device fingerprint, and the service key, so as to complete a vehicle unlocking authentication by the terminal device.

It can be seen that implementation of the vehicle unlocking authentication apparatus based on a terminal device described in FIG. 5 can improve the safety for transmitting data during the authentication process between the vehicle and the terminal device.

Embodiment Six

Figure 6:
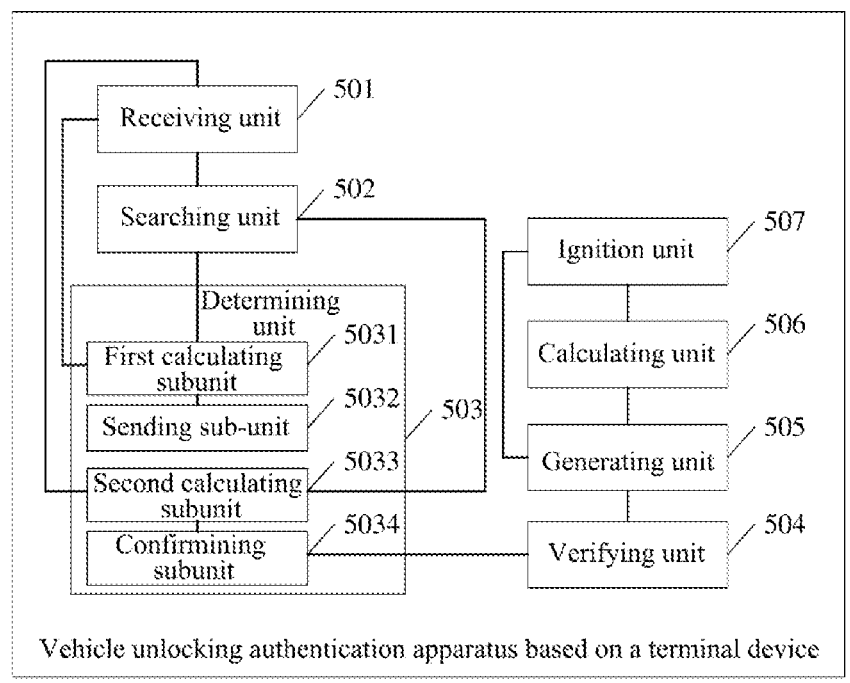
FIG. 6 is a schematic structural diagram of another vehicle unlocking authentication apparatus based on a terminal device disclosed by an embodiment of the present disclosure.

Please refer to FIG. 6, FIG. 6 is a schematic structural diagram of another vehicle unlocking authentication apparatus based on a terminal device disclosed by an embodiment of the present disclosure. Among them, the vehicle unlocking authentication apparatus based on a terminal device shown in FIG. 6 is optimized and obtained by the vehicle unlocking authentication apparatus based on a terminal device shown in FIG. 5. Compared with the vehicle unlocking authentication apparatus based on a terminal device shown in FIG. 5, the vehicle unlocking authentication apparatus based on a terminal device shown in FIG. 6 adds safety verification before the ignition operation can be performed on the vehicle after the authentication of the terminal device. For example, performing operations, such as voice identification and unlocking authentication, etc., on the vehicle, improves the safety of the vehicle. The determining unit 503 of the vehicle unlocking authentication apparatus based on a terminal device shown in FIG. 6 may comprise:

a first calculating subunit 5031, configured to calculate the first random number generated randomly and the service key, when it is detected that the first authentication code obtained by the receiving unit 501 is the same as the second authentication code obtained by the searching unit 502, to obtain exclusive OR value.

A sending sub-unit 5032 is configured to send a first response containing the exclusive OR value obtained by the first calculating sub-unit 5031 to the terminal device, so as to enable the terminal device to calculate and obtain the third authentication code according to the first response, and feed back the second response containing the third authentication code.

A second calculating subunit 5033 is configured to calculate and obtain the fourth authentication code according to the device fingerprint obtained by the receiving unit 501, the service key obtained by the searching unit 502, and the first random number, when the second response is received.

A confirming subunit 5034 is configured to confirm the completion of the vehicle unlocking authentication by the terminal device, when it is detected that the third authentication code and the fourth authentication code obtained by the second calculating subunit 5033 are the same.

In the embodiment of the present disclosure, the calculated and obtained exclusive OR value may be sent to the terminal device, so as to enable the terminal device to feed back the fourth authentication code obtained according to the exclusive OR value, and then realize the vehicle unlocking authentication by the terminal device according to the third authentication code and the fourth authentication code, so that the vehicle unlocking authentication by the terminal device is realized through the third authentication code generated by the terminal device and the fourth authentication code generated by the vehicle together, which ensures the reliability of the unlocking of the vehicle by the terminal device.

As an optional implementation, the vehicle unlocking authentication apparatus based on a terminal device shown in FIG. 6 may further comprise:

a verifying unit 504, configured to perform the authenticity verification of the collected voice information of the vehicle user after the confirming subunit 5034 confirms that the completion of the vehicle unlocking authentication the by terminal device and when it is detected that the authentication request contains an unlocking instruction;

a generating unit 505, configured to generate an authentication confirmation character and randomly generate a second random number, when the authenticity verification of the voice information verified by the verifying unit 504 is passed;

a calculating unit 506, configured to calculate and obtain the current authentication character based on the authentication confirmation character and the second random number generated by the generating unit 505;

an ignition unit 507, configured to perform an ignition operation when it is detected that the current authentication character obtained by the calculating unit 506 is the same as the authentication confirmation character generated by the generating unit 505.

In the embodiment of the present disclosure, the authenticity of the voice information of the user of the vehicle can be verified. Only after passing the authenticity verification of the voice information, can the vehicle be controlled to further start the ignition and other operations, which ensures that the user of the terminal device matches with the user information prestored in the vehicle.

As an optional implementation, the verifying unit 504 may also be configured to:

transmit the anti-theft authentication instruction to the vehicle body control module of the vehicle unlocking authentication apparatus based on a terminal device through the vehicle external Bluetooth module; perform the anti-theft authentication to the vehicle through the vehicle body control module; when the anti-theft authentication of the vehicle is passed, feed back the anti-theft authentication pass information to the vehicle external Bluetooth module through the vehicle body control module; when the vehicle external Bluetooth module receives the anti-theft authentication information, detect whether the authentication request contains an unlocking instruction.

Among them, implementing the implementation can perform the anti-theft authentication to the vehicle through the vehicle body control module, and only after passing the anti-theft authentication, can the operation corresponding to the unlocking/locking instruction further execute, thereby ensuring the safety of the current vehicle.

It can be seen that implementation of the vehicle unlocking authentication apparatus based on a terminal device described in FIG. 6 can improve the safety for transmitting data during the authentication process between the vehicle and the terminal device. In addition, the implementation of the apparatus described in FIG. 6 ensures the reliability of unlocking of the vehicle by the terminal device. In addition, implementing the apparatus described in FIG. 6 ensures that the user of the terminal device matches with the user information prestored in the vehicle. In addition, the implementation of the apparatus described in FIG. 6 ensures the safety of the current vehicle.

Embodiment 7

Figure 7:
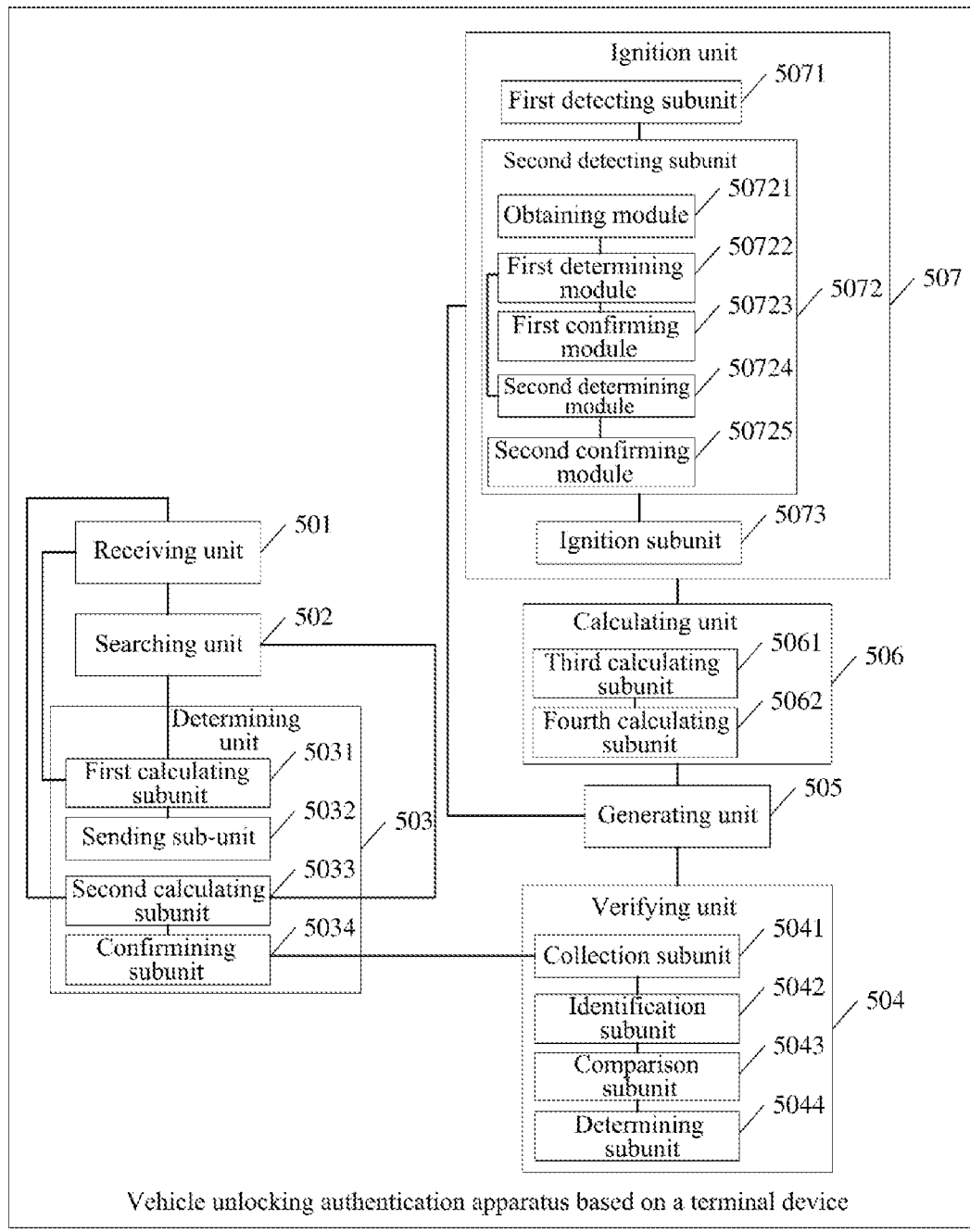
FIG. 7 is a schematic structural diagram of another vehicle unlocking authentication apparatus based on a terminal device disclosed by an embodiment of the present disclosure.

Please refer to FIG. 7. FIG. 7 is a schematic structural diagram of another vehicle unlocking authentication apparatus based on a terminal device disclosed by an embodiment of the present disclosure. Among them. the vehicle unlocking authentication apparatus based on a terminal device shown in FIG. 7 is optimized and obtained by the vehicle unlocking authentication apparatus based on a terminal device shown in FIG. 6. Compared with the vehicle unlocking authentication apparatus based on a terminal device shown in FIG. 6, the vehicle unlocking authentication apparatus based on a terminal device shown in FIG. 7 explains in more detail the method of voice identification and the method of calculating and obtaining the current authentication character, which adds the judgement of whether the vehicle meets the ignition starting condition, improves the safety of triggering the vehicle ignition, and improves the accuracy of the authentication code and the current authentication character calculation. The verification unit 504 of the vehicle unlocking authentication apparatus based on a terminal device shown in FIG. 7 can include:

a collection subunit 5041, configured to collect the voice information of the user of the vehicle after the confirming subunit 5034 confirms the completion of the vehicle unlocking authentication by the terminal device and when it is detected that the authentication request contains an unlocking instruction.

As an optional implementation, the method that the collection subunit 5041 collects the voice information of the user of the vehicle specifically may be:

outputting the voice collection prompt through the voice identification module, and the voice collection prompt can contain the semantic information that the user of the vehicle needs to talk; collecting the voice outputted by the user of the vehicle is collected through the voice identification module; extracting the voiceprint information of the user from the voice through the voice identification module and identifying the target semantics contained in the voice; generating voice information containing the voiceprint information of the user and target semantics through the voice identification module.

Among them, implementing the implementation can prompt the user to talk the corresponding voice according to the voice information in the voice collection prompt, so as to enable the vehicle unlocking authentication apparatus based on a terminal device to identify the location of the current user according to different semantics corresponding to different time or space in the process of voice identification, and jointly determine that the user corresponding to the terminal device is located on the current vehicle according to the voiceprint information, ensuring the accuracy of user identification of the vehicle.

An identification subunit 5042 is configured to perform voiceprint identification on the voice information collected by the collection subunit 5041 to obtain the target voiceprint.

A comparison subunit 5043 is configured to compare the target voiceprint obtained by the identification subunit 5042 with the prestored standard voiceprint.

A determining subunit 5044 is configured to determine that the authenticity verification of the voice information is passed when the comparison subunit 5043 determines that the target voiceprint is the same as the prestored standard voiceprint.

In the embodiment of the present disclosure, the voice information of the currently unlocking user can be collected, and the voiceprint can be identified from the semantic information. If it is detected that the voiceprint is the same as the prestored standard voiceprint, it can be considered that the user corresponding to the voiceprint has the authority to start the ignition configuration, thereby improving the safety of triggering the vehicle ignition.

As an optional implementation, the computing unit 506 of the vehicle unlocking authentication apparatus based on a terminal device shown in FIG. 7 may include:

a third calculating subunit 5061, configured to perform exclusive OR calculation of the authentication confirmation character and the second random number to obtain an authentication code;

a fourth calculating subunit 5062, configured to perform an exclusive OR calculation on the authentication code obtained by the third calculating subunit 5061 and the second random number to obtain the current authentication character.

Among them, implementing the embodiment can calculate and obtain the authentication code and the current authentication character by a method of exclusive OR, so as to enable the calculation method of the authentication code and the current authentication character to be clearer, and also improve the accuracy of the calculation of the authentication code and the current authentication character.

As an optional implementation, the ignition unit 507 of the vehicle unlocking authentication apparatus based on a terminal device shown in FIG. 7 may include:

a first detecting subunit 5071, configured to detect whether the Bluetooth connection state information is received when it is detected that the current authentication character is the same as the authentication confirmation character;

a second detecting subunit 5072, configured to detect whether the ignition starting condition is satisfied when the result of the detection of the first detecting subunit 5071 is yes;

an ignition subunit 5073, configured to perform an ignition operation when the result of the detection of the second detecting subunit 5072 is yes.

Among them, implementing the implementation can detect the Bluetooth connection state information and the ignition condition. Only under the condition that the Bluetooth connection state information and the ignition condition are detected to be both satisfied, can the vehicle perform the ignition operation, thereby ensuring the safety of the vehicle during the ignition process.

As an optional implementation, the second detecting subunit 5072 of the vehicle unlocking authentication apparatus based on a terminal device shown in FIG. 7 may include:

an obtaining module 50721, configured to obtain the unlocking duration of the vehicle when the result of the detection of the first detecting subunit 5071 is yes;

a first judging module 50722, configured to judge whether the unlocking duration obtained by the obtaining module 50721 is greater than the preset unlocking duration;

a first confirming module 50723, configured to confirm that the ignition starting condition is satisfied when the result of the judgment of the first determining module 50722 is no;

a second determining module 50724, configured to judge whether the safety module of the vehicle receives the authentication confirmation character when the result of the judgment of the first determining module 50722 is yes;

a second confirming module 50725, configured to confirm that the ignition starting condition is satisfied when the result of the judgment of the second judging module 50724 is yes.

Among them, implementing the implementation can confirm that the ignition starting condition is satisfied under the condition that the unlocking duration of the vehicle does not reach the preset maximum duration, and can also confirm that the ignition starting condition is satisfied under the condition that the safety module of the vehicle receives the authentication confirmation character, so as to enable the judging method of ignition starting condition to be more diversified, and improve the starting probability of the ignition starting condition.

It can be seen that the implementation of the vehicle unlocking authentication apparatus based on a terminal device described in FIG. 7 can improve the safety for transmitting data during the authentication process between the vehicle and the terminal device. In addition, the implementation of the apparatus described in FIG. 7 improves the safety of triggering ignition of the vehicle. In addition, the implementation of the apparatus described in FIG. 7 ensures the accuracy of user identification of the vehicle. In addition, the implementation of the apparatus described in FIG. 7 can improve the accuracy of the authentication code and the current verification character calculation. In addition, the implementation of the apparatus described in FIG. 7 ensures the safety of the vehicle during ignition. In addition, the implementation of the apparatus described in FIG. 7 improves the starting probability of the ignition starting condition.

The embodiment of the present disclosure discloses a vehicle, on which a vehicle unlocking authentication apparatus based on a terminal device is provided.

The embodiment of the present disclosure also discloses a computer-readable storage medium, where the computer-readable storage medium stores program code, where the program code includes instructions for performing part or all of the steps in the method of the above method embodiments.

The embodiment of the present disclosure also discloses a computer program product, where when the computer program product runs on a computer, causing a computer device to perform part or all of the steps in the method of the above method embodiments.

The embodiment of the present disclosure also discloses an application publishing platform, where the application publishing platform is used to publish a computer program product, where when the computer program product runs on a computer, causing the computer to perform part or all of the steps in the method of the above method embodiments.

It should be understood that the "embodiment of the present disclosure" mentioned throughout the specification means that a specific feature, structure, or characteristic related to the embodiment is included in at least one embodiment of the present disclosure. Therefore, the existing of "in the embodiments of the present disclosure" in various places throughout the specification may not refer to the same embodiment. In addition, these specific features, structures or characteristics can be combined in one or more embodiments in any suitable manner. Those skilled in the art should also know that the embodiments described in the specification all belong to optional embodiments, and the actions and modules involved are not necessarily required by the present disclosure.

In the various embodiments of the present disclosure, it should be understood that the size of the sequence numbers of the aforementioned processes does not mean the necessary sequence of execution order. The execution order of each process should be determined by its function and internal logic, and the implementation process of the embodiments of the present disclosure should not constitute any limitation. In addition, the terms "system" and "network" herein are often used interchangeably herein. It should be understood that the term "and/or" herein is only an association relationship describing associated objects, indicating that there can be three types of relationships, such as A and/or B, which can mean three cases: A exists alone, A and B exist at the same time, and B exists alone. In addition, the character "/" herein generally indicates that the context association objects are in an "or" relationship.

In the embodiments provided by the present disclosure, it should be understood that "B corresponding to A" means that B is associated with A, and B can be determined according to A. However, it should also be understood that determining B according to A does not mean determining B only according to A, and B can also be determined according to A and/or other information.

A person of ordinary skill in the art can understand that all or part of the steps in the various methods of the above embodiments can be completed through a program by instructing related hardware. The program can be stored in a computer-readable storage medium including Read-Only Memory (ROM), Random Access Memory (RAM), Programmable Read-only Memory (PROM), Erasable Programmable Read Only Memory (EPROM), One-time Programmable Read-Only Memory (OTPROM), Electronically-Erasable Programmable Read-Only Memory (EEPROM), Compact Disc Read-Only Memory (CD-ROM) or other optical disk storage, magnetic disk storage, tape storage, or any other computer-readable medium that can be used to carry or store data.

The units described above as separate components may or may not be physically separated, and the components displayed as units may or may not be physical units, that is may be located in one place or distributed on multiple network units. Part or all of the units can be selected according to actual needs to achieve the purpose of the present embodiment solution.

In addition, the functional units in the embodiments of the present disclosure may be integrated into one processing unit, or each unit may exist alone physically, or two or more units may be integrated into one unit. The above integrated unit can be realized in the form of hardware or software functional unit.

If the aforementioned integrated unit is implemented in the form of a software functional unit and sold or used as an independent product, it can be stored in a computer-accessible memory. Based on the understanding, the essence of the technical solution of the present disclosure, or the part that contributes to the existing technology or all or part of the technical solution can be embodied in the form of a software product, and the computer software product is stored in a memory and includes a number of instructions for causing a computer device (which may be a personal computer, a server, or a network device, or the like, specifically can be a processor of a computer device) to perform all or part of the steps according to the above method of the embodiments of the present disclosure The foregoing vehicle unlocking authentication method based on a terminal device and apparatus disclosed by the embodiments of the present disclosure is described in detail. Specific example is used herein to illustrate the principles and implementation of the present disclosure and the illustration of the above embodiments is only used to help understand the method and its core ideas of the present disclosure; at the same time, for persons of ordinary skill in the art, according to the idea of the present disclosure, there will be changes in the specific implementation and the scope of application. In summary, the content of the specification should be understood as a limitation of the present disclosure.

What is claimed is:

1. A vehicle unlocking authentication method, wherein the method comprises:
    receiving an authentication request sent by the terminal device, the authentication request comprises a device fingerprint and a first authentication code;
    searching for a prestored service key corresponding to the device fingerprint, and calculating and obtaining a second authentication code according to the device fingerprint and the service key;
    determining a third authentication code and a fourth authentication code based on the first authentication code, the second authentication code, the device fingerprint, and the service key;
    completing a vehicle unlocking authentication by the terminal device, according to the device fingerprint, the first authentication code, the prestored service key, the second authentication code, the third authentication code and the fourth authentication code;
    wherein completing the vehicle unlocking authentication by the terminal device, according to the device fingerprint, the first authentication code, the prestored service key, the second authentication code, the third authentication code and the fourth authentication code, comprises:
    calculating a first random number generated randomly and the service key to obtain an exclusive OR value, when it is detected that the first authentication code is the same as the second authentication code;
    sending a first response containing the exclusive OR value to the terminal device, to enable the terminal device to calculate and obtain the third authentication code according to the first response, and feed back a second response containing the third authentication code;
    calculating and obtaining the fourth authentication code according to the device fingerprint, the service key, and the first random number, when the second response is receive;
    confirming the completion of the vehicle unlocking authentication by the terminal device, when it is detected that the third authentication code is the same as the fourth authentication code.

2. The method according to claim 1, wherein after the confirming the completion of the vehicle unlocking authentication by the terminal device, comprises:
    performing authenticity verification of collected voice information of a vehicle user, when it is detected that the authentication request contains an unlocking instruction;

generating an authentication confirmation character, and generating a second random number randomly, when the authenticity verification of the voice information is passed;

calculating and obtaining a current authentication character based on the authentication confirmation character and the second random number;

performing an ignition operation when it is detected that the current authentication character is the same as the authentication confirmation character.

3. The method according to claim 2, wherein after the confirming the completion of the unlocking authentication of the vehicle by the terminal device, further comprises:

transmitting an anti-theft authentication instruction through a vehicle external Bluetooth module, and performing the anti-theft authentication on the vehicle;

feeding back the anti-theft authentication pass information when the anti-theft authentication of the vehicle is passed;

detecting whether the authentication request contains the unlocking instruction when the vehicle external Bluetooth module receives the anti-theft authentication pass information;

verifying the authenticity of the collected voice information of the user of the vehicle when it is detected that the authentication request includes the unlocking instruction.

4. The method according to claim 2, wherein the performing authenticity verification of collected voice information of a vehicle user, when it is detected that the authentication request contains an unlocking instruction, comprises:

collecting the voice information of the user of the vehicle when it is detected that the authentication request contains an unlocking instruction;

performing voiceprint identification on the voice information to obtain a target voiceprint;

comparing the target voiceprint with a prestored standard voiceprint;

determining that the authenticity verification of the voice information is passed when the target voiceprint is the same as the prestored standard voiceprint.

5. The method according to claim 4, wherein the collecting the voice information of the user of the vehicle, comprises:

outputting a voice collection prompt, containing semantic information that the user of the vehicle needs to talk;

collecting the voice output by the user of the vehicle;

extracting a voiceprint information of the user from the voice, and identifying target semantics contained in the voice;

generating the voice information containing the voiceprint information of the user and target semantics.

6. The method according to claim 5, wherein the calculating and obtaining a current authentication character based on the authentication confirmation character and the second random number, comprises:

performing exclusive OR calculation on the authentication confirmation character and the second random number to obtain an authentication code;

performing exclusive OR calculation on the authentication code and the second random number to obtain the current authentication character.

7. The method according to claim 4, wherein the performing an ignition operation when it is detected that the current authentication character is the same as the authentication confirmation character, comprises:

detecting whether Bluetooth connection state information is received, when it is detected that the current authentication character is the same as the authentication confirmation character;

detecting whether an ignition starting condition is satisfied, if the Bluetooth connection state information is received;

performing the ignition operation, if the ignition starting condition is satisfied.

8. The method according to claim 6, wherein the detecting whether the ignition starting condition is satisfied, if the Bluetooth connection state information is received, comprises:

obtaining unlocking duration of the vehicle, if the Bluetooth connection state information is received;

judging whether the unlocking duration is greater than a preset unlocking duration;

confirming that the ignition starting condition is satisfied, if the unlocking duration is less than or equal to the preset unlocking duration;

judging whether a safety module of the vehicle receives the authentication confirmation character, if the unlocking duration is greater than the preset unlocking duration;

confirming that the ignition starting condition is satisfied, if the authentication confirmation character is received.

9. The method according to claim 1, wherein the device fingerprint is obtained in the authentication request is generated by a number of feature values of the device fingerprint collected by the terminal device, and the device fingerprint is stored in one-to-one correspondence with its corresponding service key.

10. The method according to claim 1, wherein the authentication request is sent to the vehicle unlocking authentication apparatus via Bluetooth when the terminal device is in a range of Bluetooth connection with the vehicle unlocking authentication apparatus.

11. The method according to claim 1, wherein the first authentication code is obtained by the terminal device according to the device fingerprint and a service key of the terminal device.

12. The method according to claim 1, wherein the device fingerprint is generated with not less than 200 device fingerprint feature values, and the device fingerprint is used to uniquely identify a device feature of the terminal device.

13. The method according to claim 1, wherein the service key is a service public-private key pair or a service symmetric key, and the service key performs signature and encryption operation on device feature information.

14. The method according to claim 3, wherein an anti-theft authentication comprises detecting whether a door of the vehicle is opened illegally, and whether a window of the vehicle is opened illegally.

15. A vehicle unlocking authentication apparatus, comprising:

at least one processor; and a memory communicatively connected to the at least one processor; wherein, the memory stores instructions executable by the at least one processor, and the instructions are executed by the at least one processor, so that the at least one processor is configured to:

receive an authentication request sent by the terminal device, the authentication request comprises a device fingerprint and a first authentication code;

search a prestored service key corresponding to the device fingerprint, and calculate and obtain a second authentication code according to the device fingerprint and the service key;

determine a third authentication code and a fourth authentication code based on the first authentication code, the second authentication code, the device fingerprint, and the service key;

complete a vehicle unlocking authentication by the terminal device, according to the device fingerprint, the first authentication code, the prestored service key, the second authentication code, the third authentication code and the fourth authentication code;

wherein the at least one processor is further configured to:

calculate a first random number generated randomly and the service key to obtain an exclusive OR value, when it is detected that the first authentication code is the same as the second authentication code;

send a first response containing the exclusive OR value to the terminal device, to enable the terminal device to calculate and obtain the third authentication code according to the first response, and feed back a second response containing the third authentication code;

calculate and obtain the fourth authentication code according to the device fingerprint, the service key, and the first random number, when the second response is received;

confirm the completion of the vehicle unlocking authentication by the terminal device, when it is detected that the third authentication code is the same as the fourth authentication code.

16. A vehicle, comprising the vehicle unlocking authentication as claimed in claim 15.

* * * * *